Aug. 26, 1969 L. D. SCHREINER ET AL 3,462,928
HARVESTER ROLL STRUCTURE AND SUPPORT THEREFOR
Filed April 18, 1967
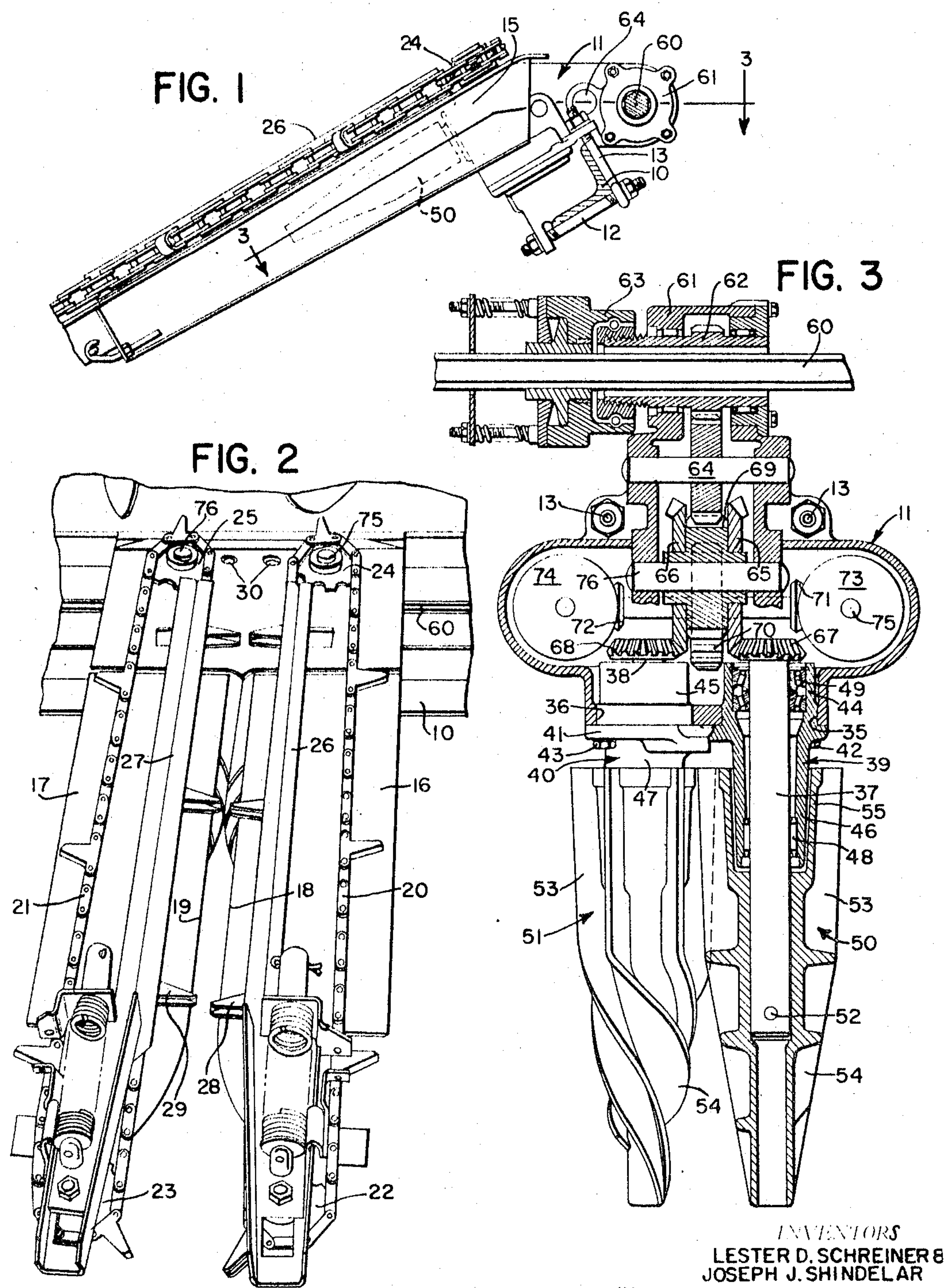
INVENTORS
LESTER D. SCHREINER &
JOSEPH J. SHINDELAR
BY William A. Murray
ATTORNEY 3,462,928

HARVESTER ROLL STRUCTURE AND SUPPORT THEREFOR

Lester Dale Schreiner, Ankeny, and Joseph John Shindelar, Des Moines, Iowa, assignors to Deere & Company, Moline, Ill., a corporation of Delaware Filed Apr. 18, 1967, Ser. No. 631,755

Int. Cl. A01d *45/02*

U.S. Cl. 56—104 5 Claims

ABSTRACT OF THE DISCLOSURE

A pair of harvesting rolls mounted on a corn harvester beneath snapping bars that define a fore-and-aft extending passage through which stalks of corn may pass, the harvesting rolls being supported on a gear housing in cantilever fashion and projecting forwardly from the gear housing to forward free ends.

Background of the invention

This invention relates to a corn harvester and more particularly to the harvesting rolls on a corn harvester. Still more particularly the invention relates to the feature of supporting the harvesting rolls at their rear ends and in cantilever fashion from the rear ends.

Heretofore it has been conventional to support a pair of harvesting or snapping rolls on a corn harvester frame. The rolls are in a fore-and-aft disposition and normally are disposed on opposite sides of a fore-and-aft extending stalk passage. The rolls cooperate and are positioned beneath a pair of snapping bars or deck plates that have fore-and-aft extending edges spaced apart transversely to define the passage for the stalks. Each of the rolls is positioned beneath the snapping bars and operates to draw the stalks downwardly between the bars until the ear of corn contacts the bars and is detached from the stalk. It has heretofore been considered necessary to make the snapping or harvesting rolls relatively long and substantially the length of the snapping bars. Consequently there has been provided on the harvester frame journals that are adapted to support the respective harvesting rolls at both their forward and their rear ends. There are certain problems that exist in this type of roll support, the primary problem being that the framework at the forward end of the roll must be sufficiently strong and heavy to support the roll. Also, in an extremely long harvesting roll, the deck plates as well as the rolls must be inclined at a relatively steep angle in order that clearance from the ground may be obtained. These problems create a situation in which there is considerable structural elements at the forward end of the harvester which not only is an expensive structure but also places considerable weight at the extreme forward end of the harvester which is an undesirable condition.

Summary of the invention

With the above in mind, it is the primary object of the present invention to provide a pair of harvesting rolls beneath the stripping plate or bars that are relatively short and are carried on a single frame at the rear upper ends of the snapping bars. The rolls are rotatably driven by gear means contained within a gear housing, there being provided a forwardly extending drive shaft that extends axially within the respective snapping rolls. The respective shafts are supported primarily by bearings or journals that are carried in the gear housing and consequently the respective harvesting rolls are supported in more or less cantilever fashion by the gear housing. The forward ends of the rolls have no support whatsoever.

More specifically it is the object of the present invention to provide rolls having a hollow rear end portion. Shaft sleeves carry the respective drive shafts for the rolls and the sleeves include a radial center portion that may be bolted to the gear housing and opposite end portions. The rear end portions extend into the gear housing and the forward end portions extend externally of the housing and axially a considerable distance along the respective shafts. The rolls, as mentioned previously, are hollow at their rear portions and the rear portions overlie the forward portions of the sleeves to permit the rolls to terminate adjacent the housing. The sleeves carry journals at their forward and rear ends that support the shafts for the rolls. The rolls are relatively short and consequently the only support required for the rolls is the journal support for the roll shafts in the respective sleeves.

Brief description of the drawings

FIG. 1 is a side view of a corn harvester roll unit incorporating the roll structure of the present invention.

FIG. 2 is a front perspective view of the roll unit shown in FIG. 1.

FIG. 3 is an enlarged view, mostly in section, of the roll structure and the gear mechanism and as taken substantially along the line 3—3 of FIG. 1.

Description of the preferred embodiment

The harvesting mechanism herein to be described may be one of many that are supported on a main corn harvester frame, indicated only partially by the transversely extending beam 10 that extends across a plurality of rows of corn. It is contemplated that the several harvesting mechanisms will be of the type mounted on the forward end of a combine and consequently the beam 10 will be supported in a suitable manner, not shown, on that combine. A gear housing 11 is bolted to the beam 10 by bolts, such as at 12, 13, that are suitably interlocked to clamp or tighten the housing 11 on the frame. The housing 11 has a forward portion, shown in dotted representation at 15, that extends forwardly and downwardly and has an upper surface on which is bolted structural plate members 16, 17 having inner and transversely spaced apart edges 18, 19 that define a fore-and-aft extending stalk passage through which stalks of corn are successively received as the harvester moves forwardly over a row of corn. Supported on the plate structure 16, 17 is a pair of continuous gathering chains 20, 21 with inner runs positioned adjacent the plant passage and supported on forward idler sprockets 22, 23 and upper driven sprockets 24, 25. Chain guards 26, 27 are provided adjacent the inner runs of the chains so as to prevent direct contact between ears of corn and the chain links. As is conventional, lugs 28, 29 operate to contact the stalks moving through the passage and to drive them rearwardly. Also, broken or fallen ears on the stalks will be driven rearwardly by the lugs 28, 29. The entire plate structure 16, 17 is bolted at 30 to the gear housing 11.

The gear housing 11 is provided with a pair of forward openings 35, 36 through which a pair of forwardly and downwardly extending drive shafts 37, 38 extends. The shafts 37, 38 are carried within a pair of integrally joined sleeves 39, 40 having a central and radially extending flange portion 41 that may be bolted as at 42, 43 to the housing 11. The sleeves 39, 40 also include rear portions 44, 45 respectively that are disposed within the housing 11 and front portions 46, 47 that project forwardly and downwardly considerable distances from the housing 11. The sleeves 39, 40 carry internal front and rear journals 48, 49 that carry the respective shafts 37, 38. Supported on the shafts 37, 38 is a pair of harvesting rolls 50, 51. The rolls 50, 51 are pinned, as at 52, to the respective shafts 37, 38. The rolls 50, 51 each have a rear portion with axially extending radial flutes 53 that mesh with one another beneath the plant passage and forward spiraled flutes 54 that taper to a relatively small forward end of the respective roll. The rear end portion of each of the rolls 50, 51 terminates adjacent the housing 11 and is hollow as at 55 a substantial length thereof so as to receive the forward portions 46, 47 of the respective sleeves 39, 40. As may best be seen from viewing FIG. 3, the sleeves 39, 40 support the respective drive shafts 37, 38 a substantial length of the relatively short rolls 50, 51 and consequently provide sufficient support to permit the forward ends of the respective rolls to be journal-free.

The harvesting mechanism is driven by a main transversely extending drive shaft 60 that may extend completely across a plurality of harvesting mechanisms. The housing 11 is provided with a rear portion 61 that receives the shaft 60 and contains therein a spur gear 62 clutched at 63 to the shaft 60. The shaft 60 drives a countershaft 64 and gear which in turn drives a gear cluster including a pair of bevel gears 65, 66 meshing with bevel gears 67, 68 on the respective roll drive shafts 37, 38. The gear cluster includes a central spur gear 69 drivingly connected to a spur gear 70 that drives a pair of spur pinions 71, 72. The pinions 71, 72 engage and drive bevel gears 73, 74 fixed to vertical shafts 75, 76 on which are carried chain sprockets 24, 25. The gear means within the gear housing 11 therefore not only drives the rolls 50, 51 but also the chains 20, 21. The gear housing 11 therefore not only serves as the basic support for the roll structure 16, 17 but also as the housing for the entire drive mechanism to the harvesting mechanism.

We claim:

1. In a corn harvester having a frame, a main drive means, and laterally disposed structure supported on the frame, the structure including a pair of fore-and-aft extending inclined plates having upper and lower ends with opposed and spaced apart fore-and-aft extending edges defining a fore-and-aft extending passage for successively receiving stalks of a row of corn, the improvement residing in: a gear housing supported on the frame at the upper end of the plates and having gear means therein drivingly connected to the main drive means and for driving the rear end portions of a pair of fore-and-aft extending shafts spaced apart transversely beneath the plates and on opposite sides of the passage, the housing further having a main portion encasing the gear means and a pair of rigidly united and forwardly projecting shaft sleeves extending lengthwise of and terminating at forward ends a substantial distance forward of the rear end portions of the respective shafts; journal means at the forward ends of the respective sleeves for supporting the respective shafts; and a pair of stalk-engaging rolls fixed to the respective shafts forward of the sleeves and having hollow rear portions adapted to encompass the sleeves and to terminate proximate to the juncture of the respective sleeves with the main portion of the housing.

2. The invention as set forth in claim 1 in which the rolls are composed of forward portions adjoining rear portions and the latter portions have radially extending flutes thereon intermeshing with one another, and the forward portions have forward spiral flutes continuing from the rear flutes and tapering to relatively small front terminal ends; and in which the sleeves extend within the hollow rear portions at least half of the lengths of the rear portions.

3. The invention as set forth in claim 2 in which the rear portion of each roll has an axial length less than the axial length of the respective forward portion.

4. The invention as set forth in claim 1 in which the sleeves include radial flange means united with the housing by bolts, a pair of forward portions forward of the flange means and a pair of rear portions rearward of the flange means, the latter portions being disposed within the housing and carrying journals for supporting the rear ends of the respective shafts.

5. In a corn harvester having a main frame, a main drive, and laterally disposed structure supported on the frame, the structure including a pair of fore-and-aft extending inclined plates having upper and lower ends with opposed and spaced apart fore-and-aft extending edges defining a fore-and-aft extending passage for successively receiving stalks of a row of corn, the improvement residing in: a gear housing having a pair of forward openings opening forwardly and having gear means therein drivingly connected to the main drive means for driving the rear end portions of a pair of fore-and-aft extending shafts spaced apart transversely beneath the plates and on opposite sides of the passage and extending through the respective openings, a pair of shaft sleeves extending lengthwise of the respective shafts and having radial flange portions intermediate their ends for rigid connection to the housing adjacent the openings and having rear end portions retained within the housing and forward portions projecting a substantial distance forward of the flanges; journal means at the forward and rear end portions of the respective sleeves for supporting the respective shafts; and a pair of stalk-engaging rolls fixed to the respective shafts forward of the sleeves and having hollow rear portions adapted to encompass the sleeves whereby the rolls may terminate proximate the flanges

References Cited

UNITED STATES PATENTS

| | | | |
|---|---|---|---|
| 2,525,058 | 10/1950 | Andrews | 56—18 |
| 3,101,579 | 8/1963 | Karlsson | 56—18 |

ANTONIO F. GUIDA, Primary Examiner